(12) United States Patent
Kredo et al.

(10) Patent No.: US 6,823,370 B1
(45) Date of Patent: Nov. 23, 2004

(54) SYSTEM AND METHOD FOR RETRIEVING SELECT WEB CONTENT

(75) Inventors: Thomas J. Kredo, Rochester, NY (US); Kenneth J. Kohl, Penfield, NY (US); Stephen Knight, Rochester, NY (US)

(73) Assignee: Nortel Networks Limited, St. Laurent (CA)

( * ) Notice: Subject to any disclaimer, the term of this patent is extended or adjusted under 35 U.S.C. 154(b) by 197 days.

(21) Appl. No.: 10/191,081

(22) Filed: Jul. 10, 2002

Related U.S. Application Data

(63) Continuation of application No. 09/420,154, filed on Oct. 18, 1999, now abandoned.

(51) Int. Cl.[7] .............................. G06F 15/16
(52) U.S. Cl. ................. 709/206; 709/217; 709/218; 709/219; 709/246
(58) Field of Search ................. 709/204–207, 709/217–219, 245–246; 704/270, 270.1, 277; 379/88.13, 88.14, 88.17, 90.01, 93.14

(56) References Cited

U.S. PATENT DOCUMENTS

| 5,727,159 A | 3/1998 | Kikinis ....................... 709/246 |
|---|---|---|
| 5,761,280 A | 6/1998 | Noonen et al. .......... 379/93.27 |
| 5,799,063 A * | 8/1998 | Krane ......................... 709/219 |
| 5,838,682 A | 11/1998 | Dekelbaum et al. ........ 370/401 |
| 5,873,077 A | 2/1999 | Kanoh et al. ................... 707/3 |
| 5,875,436 A | 2/1999 | Kikinis ........................ 705/34 |
| 5,884,262 A | 3/1999 | Wise et al. ................. 709/219 |
| 5,926,789 A * | 7/1999 | Barbara et al. .......... 704/270.1 |
| 6,240,448 B1 * | 5/2001 | Imielinski et al. .......... 709/218 |
| 6,298,129 B1 * | 10/2001 | Culver et al. .......... 379/202.01 |
| 6,366,650 B1 * | 4/2002 | Rhie et al. .................. 709/219 |
| 6,621,502 B1 * | 9/2003 | Nair et al. .................. 709/206 |
| 6,643,621 B1 * | 11/2003 | Dodrill et al. .............. 709/219 |

* cited by examiner

*Primary Examiner*—Bharat Barot
(74) *Attorney, Agent, or Firm*—Hunton & Williams LLP

(57) ABSTRACT

An operator assisted system helps a caller browse the World Wide Web without requiring the caller use a computer. The invention enables a caller on a POTS or cellular/wireless telephone connection to connect with an operator to search and select Web-based content. The invention collects desired search results and passes them to an IVR (Interactive Voice Response) system for presentation to the POTS/Cellular caller. The invention facilitates high-quality search request interpretation and highly-efficient Web searches by a trained operator, using a visual PC based browser.

12 Claims, 2 Drawing Sheets

SYSTEM AND METHOD FOR RETRIEVING SELECT WEB CONTENT

This application is a continuation application of U.S. patent application Ser. No. 09/420,154, filed on Oct. 18, 1999.

BACKGROUND OF INVENTION

This invention relates generally to the retrieval of information from accessible sources on or via the World Wide Web (WWW, or Web). More specifically, the invention relates to the retrieval of Web-based information using ordinary telephones to browse and select the desired information from any of a large number of differently-organized sources available through the Web.

1. Definitions

HDML: Handheld Device Markup Language, and the Wireless Markup Language (WML)—are languages, similar to HTML, that allows the text portion of a Web page to be presented on cellular phones and personal digital assistants (PDAs) via wireless access.

2. Discussion of Prior Art

U.S. Pat. No. 5,884,262 (Wise et al.) describes a telephone voice browser enabling a caller to access Web pages and data including audio files and documents in various formats, browsing the Web and selecting content through the use of speech-to-text analysis of spoken commands and DTMF signals issuing from the caller's telephone connection, and obtaining content through audio and text-to-speech processing onto the caller's connection. This speech-to-text method of browsing and selecting content has three disadvantages.

First, it relies on speech recognition technology. Even after decades of effort, large-vocabulary, speaker-independent, continuous-speech voice recognition does not produce highly-reliable speech-to-text results without unacceptable cost in time and hardware. Regional and ethnic accents and cadences, widely-varying speech habits, unreliable telephone connections, obscure vocabulary and syntax usage, all contribute to increased error rates in automated speech recognition processing. Reduction of error rate requires restriction of one or more of the dimensions of vocabulary range, speech continuity, and speaker-to-speaker variation. Such restriction limits the range of usefulness of the Wise proposal.

Second, for data retrieval, the Wise proposal requires an easy-to-use yet powerful interface between the ordinary telephone user and any number of Web-accessible databases of widely-varying complexity and sophistication. Such a requirement limits the range of users to the few who are satisfied with the results of simple queries and the few who possess sufficient database-search skills to use successfully the results returned by more-complex requests.

Despite progress in 'intelligent' software, complexities of language still limit the range and power of such methods. Much effort has been expended to make database query languages such as SQL more 'user-friendly', but such efforts have forced a tradeoff between usefulness of search results and simplicity of performing the searches. No simple substitute has yet been found for skilled human search practice.

Third, the speech recognition process in Wise must be applied to speech as delivered from a user across an ordinary PSTN POTS line. Speech delivered this way sharply attenuates speech frequencies outside the range of 300–3300 Hz, making its analysis for content significantly more difficult and inconclusive than such analysis for speech delivered with full fidelity. The result is a significantly-increased error rate in recognition, which diminishes the value of Wise for an ordinary user.

Problems inherent in speech recognition technology are compounded by typical low-fidelity telephone connections. Given such problems, the use of voice menus becomes predominant as a way of reducing error rates in the user-browser dialog. Voice menus are time-consuming (particularly where URLs are presented to the user) and limited to a short range of choices, again reducing the value of inventions, such as Wise, using them.

U.S. Pat. No. 5,873,077 (Kanoh et al.) describes a fax-based Web-access method and apparatus allowing a user to exchange faxes with a Website; the Website scans the user's faxes to select a course of action or a collection of data to return via a fax. Kanoh does not describe any voice access or any non-fax telephone usage.

U.S. Pat. No. 5,838,682 (Dekelbaum et al.) describes a dual-link system, using both a network connection and a PSTN line, to establish and use a secure connection for customer-merchant transactions. It does not address customer-driven browsing and searching the Web, independently of a merchant or sales entity.

U.S. Pat. No. 5,761,280 (Noonen et al.) describes a method and interface for Web browsing using telephone DTMF inputs, a menu system, and a display system attached to the telephone. It does not address the use of audio speech-to-text or text-to-speech.

U.S. Pat. No. 5,727,159 Kikinis) describes a system whereby low-end computers similar to personal digital assistants (PDAs) not ordinarily capable of Web browsing may be used to browse the Web. It does not address any telephone interfaces.

U.S. Pat. No. 5,875,436 (Kikinis) describes a work-order transcription and communication system using the Internet. It does not address Web browsing at all.

The Web-On-Call™ product made by General Magic, Inc., is a software product designed to be installed in a Web server, which provides a client user the ability to browse the Web using a telephone, in a manner similar to the Wise proposal. Like the Wise proposal, it relies on automated methods to respond to the user's requests. The Web-On-Call™ product is subject to the same limitations outlined above for Wise.

SUMMARY

The invention enables a caller on a POTS or cellular/wireless telephone connection to connect with an operator to search and select Web-based content. The invention collects desired search results and passes them to an IVR (Interactive Voice Response) system for presentation to the POTS/Cellular caller. The invention facilitates high-quality search request interpretation and highly-efficient Web searches by a trained operator, using a visual PC-BASED browser, while utilizing the existing efficiencies of automated announcement IVR systems.

The invention provides a caller with an operator assisted search service that translates Web text to audio so that the caller can intelligently browse the World Wide Web without the caller operating computer. The elements of the system include a workstation, an interactive voice response (IVR) module, an audio web server, and a switch. The workstation and the IVR are connected to the caller via the switch. Both are also connected to an audio web server. The workstation has a browser for searching the Web. When the operator finds the Web information requested by the caller, the operator uses a software program to highlight the information. The software program automatically removes non-textual material, such as graphics. The text information is then stored on an audio web server. The workstation has caller identification information, such as the calling card number of the caller, the CLID of the caller or an access code required for the service. The selected files are stored on the audio web browser in accordance with the identification data of the caller. The workstation hands the call off to the IVR which delivers the selected information to the caller as part of a customary IVR session.

DETAILED DESCRIPTION OF THE INVENTION

Figure 1:
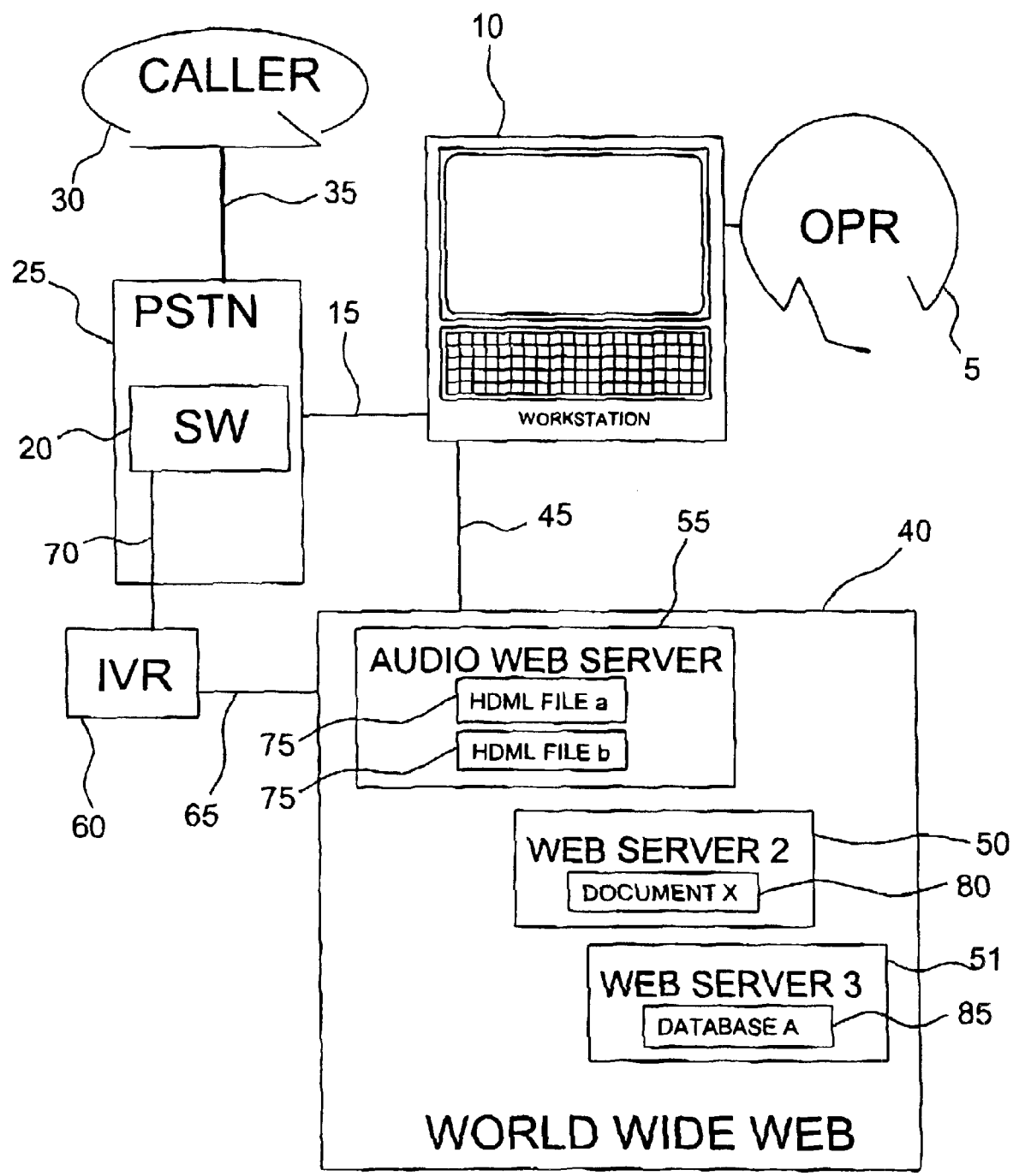
FIG. 1 shows the components and structure of the invention and its supporting telecommunications environment.

Refer to FIG. 1. In the invention's preferred embodiment, the system's components and connections are as follows. A workstation 10 is coupled to a public switched telephone network (PSTN) 25 via an audio link 15. The operator 5 has a two-way audio connection with the caller 30 through the audio link 15. Audio link 15 is a 56-kilobit-per-second channel comprising one of the 24 channels of a T1 connection. A caller 30 connects to PSTN 25 via an ordinary POTS telephone line 35.

Workstation 10 is also connected to the World Wide Web 40 via an Ethernet connection 45 using TCP/IP. That protocol enables workstation 10 to communicate with Web servers 50, 51 and audio Web Server 55. A computer program (not shown) operates on workstation 10 for selecting portions of Web pages and for removing non-textual indicia (graphics, photos, etc.) from the selected portions of the Web pages. Details of the construction and operation of such a program are not necessary and are not disclosed because one skilled in the art may implement such programs in a variety of ways. A caller 30 is connected to the PSTN. Switch 20 on the PSTN connects the caller 30 to the operator 5 via audio link 15 and workstation 10.

An audio announcement system 60 (also called IVR, or Interactive Voice Response) is connected to World Wide Web 40 via an Ethernet connection 65 using TCP/IP. IVR 60 is also connected to switch 20 via a T1 or VoIP connection 70 using TCP/IP. That protocol enables IVR 60 to communicate with audio Web Server 55 and switch 20.

Audio Web Server 55 is a computer coupled to the Web 40. It includes a central processing unit, memory for storing operating system and application programs, and input and output devices for receiving and sending transmissions over the Web 40. Audio Web Server 55 contains memory storage space adequate to store a number of HDML or WML files 75 that can be played for caller 30. Web servers 50, 51 contain documents 80 and databases 80, 85, respectively. Each database includes information retrievable by operator 5 using workstation 10.

Operation of Invention

Figure 2:
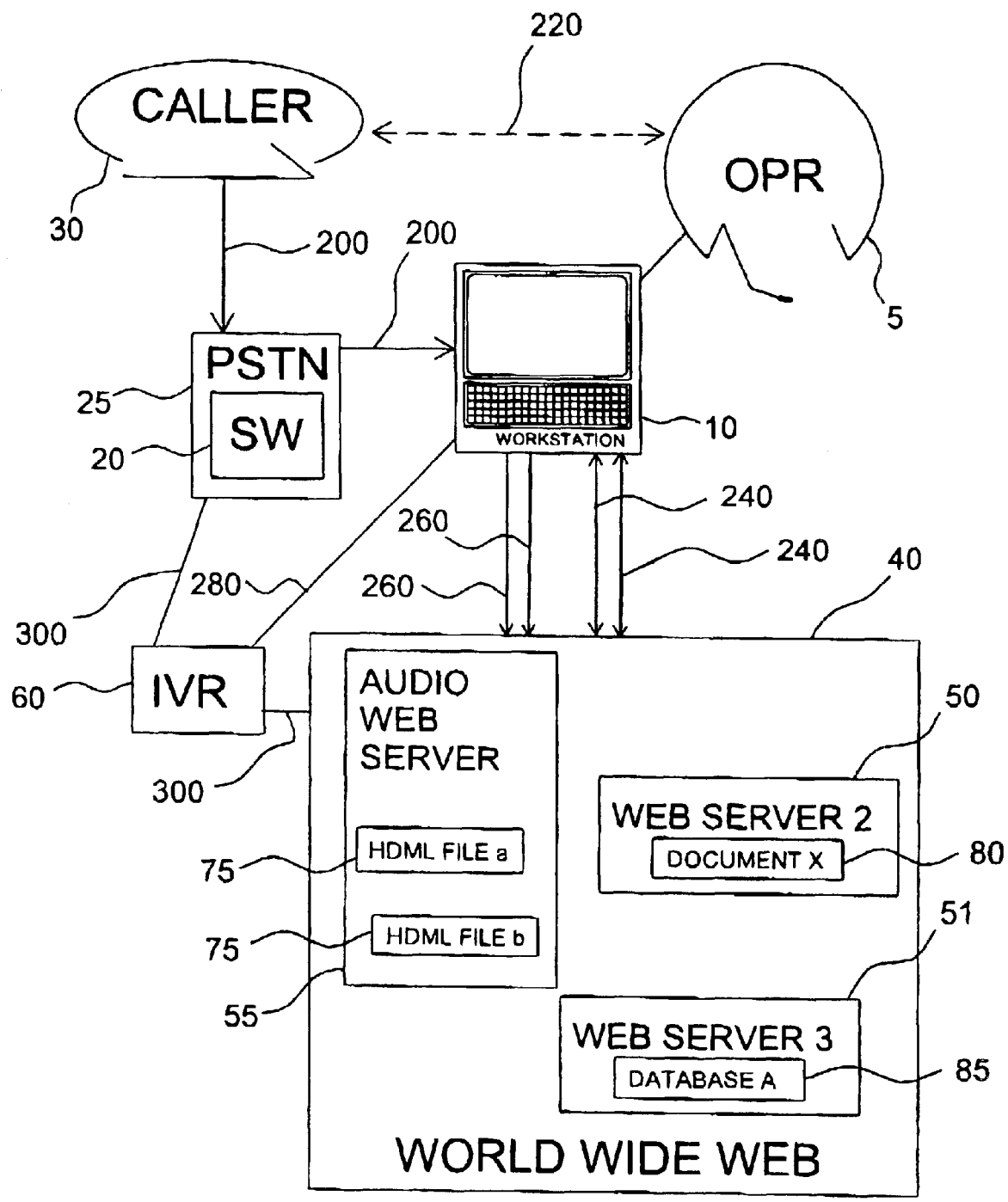
FIG. 2 shows the operation of the invention as it takes place within and among the components and structure portrayed in FIG. 1.

Refer to FIG. 2. In the invention's preferred embodiment, a caller 30 uses the PSTN 25 to make a call 200 by dialing a special access number such as 311. Switch 20 routes call 200 to an available operator workstation 10 serving operator 5. A conversation 220 between caller 30 and operator 5 results in a number of Web-based searches 240 by operator 5 through Web documents 80 and databases 85 until the information desired by caller 30 is visible to operator 5. Operator 5 uses conventional browser software to highlight the information that will be announced to caller 5. Operator 5 then invokes a software program in workstation 10, which accepts the highlighted information, removes all graphic images and other non-text material, and performs a transmission 260 of the remaining text, along with the URL (universal record locator) of the source file 80 or 85, into an HDML (or WML) file 75 on a local Web Server 55. The invention automatically associates the selected HDML files 75 with a specific caller 30. The HDML files 75 are stored in a directory of the Audio Web Server 55 under the CLID (Calling Line ID) number for caller 30 as qualifying file identification.

Operator 5 then establishes a connection 280 with IVR 60, and releases caller 30 to IVR 60 and terminates conversation 200. IVR 60 retrieves HDML files 75 using the CLID of caller 30 to identify file 75, and announces HDML files 75, using well-known Text-to-Speech or WAV file technology, by initiating a dialog 300 with caller 30. To help caller 30 select and operate on files 75, IVR 60 presents caller 30 with a voice menu of additional options such as back, forward, stop, fax the original URL page to a phone number, next file, previous file, exit. Using voice menus in a dialog 300 with audio subsystem 60, caller 30 navigates files 75 with DTMF tones to specify commands to be carried out by audio subsystem 60. Caller 30 terminates connection 300 by hanging up.

Alternate Embodiments of the Invention

The invention may be used with display telephones such as an ADSI phone. ADSI phones are capable of presenting visual displays of significant desirable text portions of retrieved Web pages. With an ADSI phone a caller may directly display HDML files. In an alternate embodiment, the workstation 10 or IVR 60 may determine from PSTN 200 whether or not the caller is using an ADSI instrument, whether or not the ADSI instrument's display is usable. If it the ADSI display feature is useable, the workstation 10 or IVR 60 sends Web page text directly from the stored HDML files 75 to the phone's display. That embodiment eliminates the need for text-to-speech translation. The ADSI phone can also display menus and process menu selections for navigation among HDML files. The invention sends menus directly to the ADSI phone's display and processes caller menu selections directly, again eliminating any text-to-speech translation.

While the invention uses HDML or WML formats, no particular format is required. Specific implementations of the invention may employ any format for file storage which is usable in the manner described in the operation of the invention. Likewise, the use of Ethernet and TCP/IP is not required and systems using the invention may employ any link type or link protocols which meet the functional requirements of the invention's operation.

The use of the PSTN itself, with its switching equipment, is not required. Those skilled in the art understand that the invention may employ connection, switching, and voice-over-IP capabilities of the Internet to deliver the same services as described in the preferred embodiment above.

The invention may, without loss of its essential character and workings, employ any workable combination of the choices listed in these alternative embodiments.

Illustrative Example

A caller using the invention requests legal assistance from an operator. The operator determines the type of assistance needed, retrieves a series of listings of law firms meeting the caller's needs, stores the listings in HDML form, and activates the audio announcement subsystem. The caller hears the following announcement, delivered by the audio announcement subsystem:

"Three firms were found which meet the requirements you listed. If you wish to hear a full description for Hanford, Sills & Harvey, press 1. For Shakeman & Torrelli, press 2. For Willis, Snipes, Cruise, Jackson & Fishburne, press 3. If during the announcement for a firm you would like to be connected immediately to that film, press the pound sign . . ."

The caller presses 2. The audio subsystem responds by speaking the Web page text retrieved from the Shakeman and Torrelli Web page. As the announcement ends, the caller presses the pound sign on the phone, and the audio subsystem signals the switch to transfer the call to the Shakeman and Torrelli phone number. (This immediate connection capability is currently a feature of available call-processing subsystems.) The call then proceeds as an ordinary telephone call between the caller and the firm of Shakeman and Torrelli.

The invention could carry the caller further into the web pages of the selected site. For example, the site may include biographies of members of the Shakeman & Torrelli firm. At the request of the caller 30, the operator highlights one or more of the biographies and stores them on the Audio Web Server 55 for playing by IVR 60.

Those skilled in the art understand that workstation 10 and audio web server 55 are computers that include central processing units, memories, operating system programs and application programs. The switch 20 is also a computer-controlled switch that connects one caller to another. Likewise, the IVR 60 is computer-controlled equipment for generating audio signals and playing audio files in response to inputs received from callers.

Conclusion, Ramifications, and Scope of Invention

The invention offers a simple, clean and functionally powerful method for a caller using an ordinary telephone and telephone infrastructure to access highly-specific information stored on the World Wide Web without requiring recourse to demandingly sophisticated technology and interfaces on the part of the caller.

The invention takes advantage of already-available operator services to eliminate the need for complex search engines in locating desirable Web data, along with the significant skill requirements such search engines impose on their users.

The invention avoids involving an ordinary caller in the complex requirements and limitations of automated speech-recognition technology, rendering its services more attractive to those challenged by such restrictions on their everyday speech.

The invention, while using the current telephony infrastructure and interfaces in their most common forms, still offers the supplier of its services the ability to upgrade service capabilities to accommodate new technologies such as the ADSI phone and voice-over-IP telephone service. Such upgrades can be performed progressively at limited incremental cost, making them attractive to potential service suppliers.

The invention represents, therefore, a new revenue opportunity for its suppliers by leveraging their expertise in automated Operator Services systems. Current telephony service suppliers would be able to extend their capabilities economically by using their existing infrastructure.

From the above descriptions, figures and narratives, the invention's advantages in supplying a telephone caller with convenient and rapid access to information from the World Wide Web should be clear.

Although the description, operation and illustrative material above contain many specific features, those features should not be construed as limiting the scope of the invention but as merely providing illustrations and examples of some of the preferred embodiments of this invention.

Thus the scope of the invention should be determined by the appended claims and their legal equivalents, rather than by the examples given above.

What is claimed is:

1. A system for providing a caller with audio translations of selected portions of World Wide Web pages comprising:

a workstation, an interactive voice response module, an audio web server, and a switch;

the workstation in communication with the interactive voice response module, the audio web server, and the World Wide Web, said workstation including means for selecting portions of pages from locations on the World Wide Web and storing said selected portions as files in the audio web server;

the audio web server in communication with the workstation, the interactive voice response module and the World Wide Web for storing files selected by the workstation;

the interactive voice response module in communication with the audio web server and the workstation for generating audio signals corresponding to the files stored on the audio web server;

the switch for connecting a telephone caller to the workstation and for connecting the interactive voice response module to the caller.

2. The system of claim 1 wherein the switch generates data signals identifying the caller and the workstation stores the selected Web page portions in the audio web server in accordance with the caller identification data signals.

3. The system of claim 2 wherein the audio web server comprises a computer with a memory for storing selected portions of Web pages in accordance with caller identification data signals.

4. The system of claim 1 wherein the workstation further comprises a software program for selecting portions of Web pages and removing non textual indicia from said selected portions.

5. The system of claim 1 wherein the workstation is administered by a live operator.

6. A method for assisting a caller in browsing the World Wide Web comprising the steps of:
   selecting one or more Web pages or portions of Web pages;
   removing non-textual indicia from the selected pages or portions of pages to form selected files and storing the selected files on an audio server in accordance with identification data corresponding to the caller;
   conducting an interactive voice response session with the caller; and
   playing one or more of the selected files to the caller in accordance with the results of the interactive voice response session.

7. The method of claim 6 where the one or more Web pages or portions of Web pages are selected by a live operator.

8. A computer workstation with a network connection to the World Wide Web for selecting and translating portions of World Wide Web pages comprising:
   means for receiving and transmitting telephone voice signals over a public switched telephone network or a packet switched data network;
   means for browsing the World Wide Web and for selecting pages or portions of pages at locations on the World Wide Web, wherein said selected pages or portions of pages include text and non-text indicia;
   means for removing non-text indicia from the selected pages or portions of pages to form a selected text file;
   means for storing the selected text file; and
   means for converting the stored text file to audio signals representative of the selected text and transmitting the audio signals to a telephone caller.

9. The computer workstation of claim 8 further comprising:
   means for initiating a voice inquiry to a caller; and
   means for generating an output voice signal corresponding to the stored text file.

10. The computer workstation of claim 8 further comprising:
   means for receiving a caller identification signal representative of the identity of a caller; and
   means for storing the selected Web page portions in accordance with the caller identification signal.

11. The computer workstation of claim 8 wherein the means for removing non-textual indicia from the selected pages or portions of pages comprises a software program for selecting portions of Web pages and removing non-textual indicia from said selected portions.

12. The system of claim 8 wherein the means for browsing the World Wide Web and for selecting pages or portions of pages at locations on the World Wide Web are operated by a live operator.

* * * * *